United States Patent
Ang et al.

(10) Patent No.: US 10,520,626 B2
(45) Date of Patent: Dec. 31, 2019

(54) CONTINUOUS BEAMFORMING WHILE MOVING: METHOD TO REDUCE SPATIAL ALIASING IN LEAK DETECTION

(71) Applicant: Halliburton Energy Services, Inc., Houston, TX (US)

(72) Inventors: Yi Yang Ang, Singapore (SG); Nam Nguyen, Singapore (SG); Joni Lie, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 172 days.

(21) Appl. No.: 15/308,681

(22) PCT Filed: May 11, 2016

(86) PCT No.: PCT/US2016/031772
§ 371 (c)(1),
(2) Date: Nov. 3, 2016

(87) PCT Pub. No.: WO2016/209388
PCT Pub. Date: Dec. 29, 2016

(65) Prior Publication Data
US 2017/0184751 A1    Jun. 29, 2017

Related U.S. Application Data

(60) Provisional application No. 62/184,995, filed on Jun. 26, 2015.

(51) Int. Cl.
*G01V 1/50* (2006.01)
*E21B 47/10* (2012.01)
*G01V 1/44* (2006.01)

(52) U.S. Cl.
CPC ............... *G01V 1/50* (2013.01); *E21B 47/10* (2013.01); *E21B 47/101* (2013.01); *G01V 1/44* (2013.01)

(58) Field of Classification Search
CPC .. G01V 1/50; G01V 1/44; E21B 47/10; E21B 47/101
See application file for complete search history.

(56) References Cited

U.S. PATENT DOCUMENTS

| | | | |
|---|---|---|---|
| 4,114,721 A | 11/1978 | Glenn, Jr. | 4/67 |
| 5,917,160 A * | 6/1999 | Bailey | G01S 5/20 181/112 |
| 9,951,585 B1 * | 4/2018 | Volk | E21B 43/003 |

(Continued)

OTHER PUBLICATIONS

Jing et al, Sound source localisation using a single acoustic vector sensor and multichannel microphone phased arrays, p. 1-8 (Year: 2014).*

(Continued)

*Primary Examiner* — Mohammad K Islam
(74) *Attorney, Agent, or Firm* — Benjamin Fite; C. Tumey Law Group PLLC

(57) ABSTRACT

Tools, systems, and methods may be configured for or include detecting one or more underground acoustic sources and localizing them in depth and radial distance from a wellbore using an array of at least three acoustic sensors disposed in the wellbore in conjunction with array-signal-processing that accounts for movement of the acoustic sensors and spatial aliasing by using adaptive time dependent modelled steering vector weights.

20 Claims, 15 Drawing Sheets

(56) References Cited

U.S. PATENT DOCUMENTS

| | | | |
|---|---|---|---|
| 2003/0078734 A1 | 4/2003 | Ozbek | |
| 2006/0133203 A1 | 6/2006 | James et al. | |
| 2008/0175099 A1 | 7/2008 | Hawthorn et al. | |
| 2009/0299637 A1* | 12/2009 | Dasgupta | G01V 1/288 702/12 |
| 2010/0265795 A1* | 10/2010 | Johnson | G01V 1/44 367/32 |
| 2010/0268489 A1 | 10/2010 | Lie et al. | |
| 2012/0069713 A1* | 3/2012 | Geerits | G01V 1/48 367/99 |
| 2012/0106292 A1* | 5/2012 | Fuller | G01V 1/42 367/27 |
| 2012/0120767 A1* | 5/2012 | Vu | G01V 1/46 367/31 |
| 2012/0227500 A1* | 9/2012 | Market | G01V 1/50 73/624 |
| 2013/0255940 A1* | 10/2013 | Rochford | E21B 47/00 166/255.2 |
| 2014/0104979 A1* | 4/2014 | Stolarczyk | G01S 15/876 367/7 |
| 2014/0169127 A1* | 6/2014 | Orban | G01V 1/40 367/25 |
| 2015/0177403 A1* | 6/2015 | Haugen | G01V 1/40 73/152.47 |
| 2016/0084062 A1* | 3/2016 | Negre | E21B 47/12 166/250.01 |
| 2016/0091626 A1* | 3/2016 | Kostov | G01V 11/00 324/346 |
| 2016/0202381 A1* | 7/2016 | Hill | G01V 3/18 324/338 |
| 2016/0274256 A1* | 9/2016 | Coates | G01V 1/282 |
| 2016/0291189 A1* | 10/2016 | Collins | E21B 47/101 |

OTHER PUBLICATIONS

Odom et al., Passive Towed Array Shape Estimation Using Heading and Acoustic Data, IEEE Journal of Oceanic Engineering, vol. 40, No. 2, 2015, pp. 465-474.

Cigada et al., Moving Microphone Arrays to Reduce Spatial Aliasing in the Beamforming Technique: Theoretical Background and Numerical Investigation, J. Acoust. Soc. Am. 124 (6), 2008, pp. 3648-3658.

Pesavento et al., Direction Finding in Partly Calibrated Sensor Arrays Composed of Multiple Subarrays, IEEE Transactions on Signal Processing, vol. 50, No. 9, 2002, pp. 2103-2115.

Maslennikova et al., Spectral Noise Logging Data Processing Technology, SPE 162081, SPE Russian Oil & Gas Exploration & Production Technical Conference and Exhibition held in Moscow, Russia, Oct. 2012.

Johns et al., Applied Ultrasonic Technology in Wellbore-Leak Detection and Case Histories in Alaska North Slope Wells, SPE Production and Operations, May 2009, pp. 225-232.

Julian et al., Detecting Ultra-Small Leaks with Ultrasonic Leak Detection-Case Histories From the North Slope, Alaska, 2007 International Oil Conference and Exhibition in Mexco held in Veracruz, Mexico, Jun. 2007, SPE 108906.

ISR/WO for PCT/US2016/031772 dated Aug. 16, 2016.

* cited by examiner

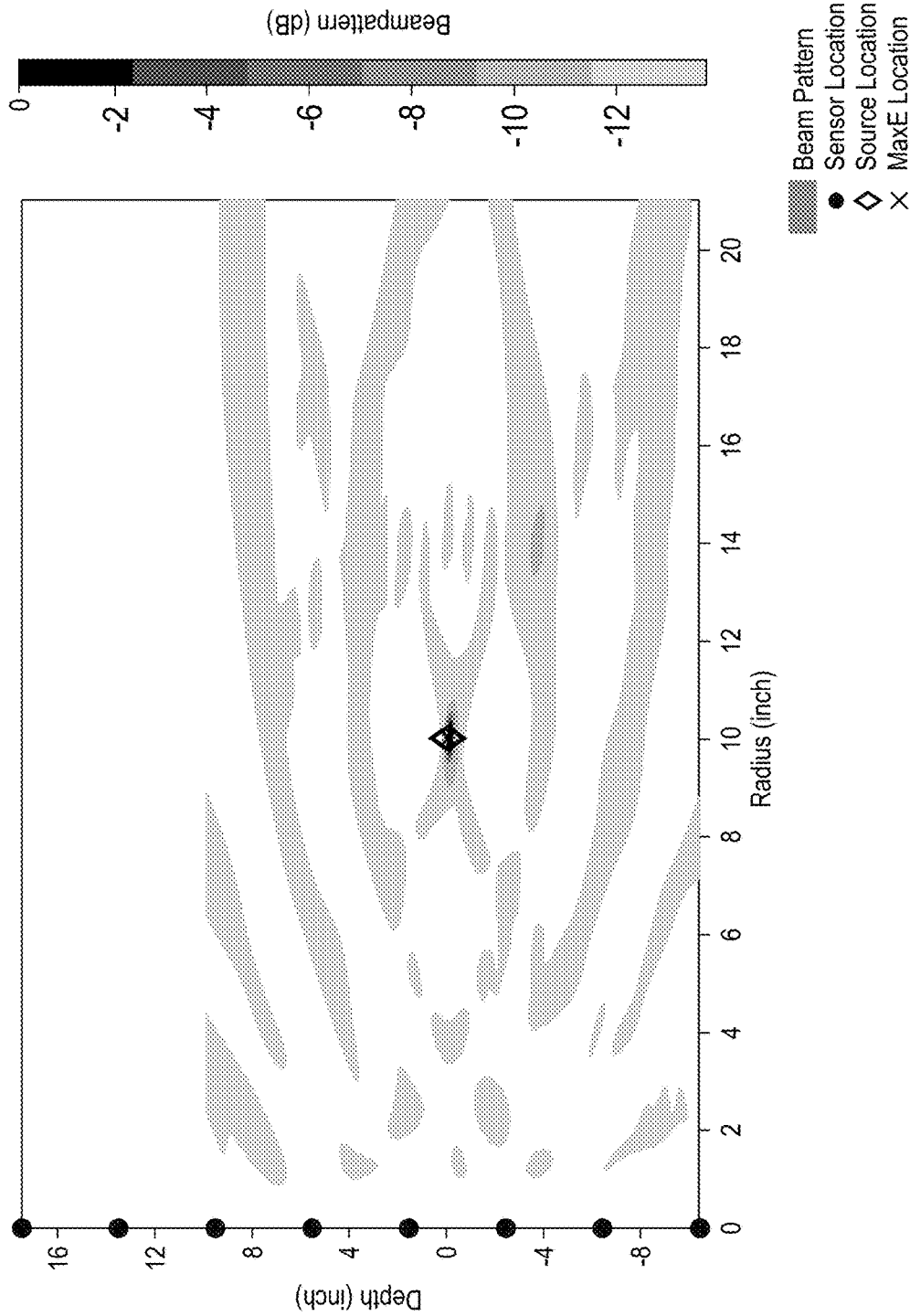

CONTINUOUS BEAMFORMING WHILE MOVING: METHOD TO REDUCE SPATIAL ALIASING IN LEAK DETECTION

BACKGROUND

The present application relates to wellbore leak detection.

During the life cycle of an oil or gas well, it is desirable to monitor and maintain well integrity. In particular, the integrity of the well barriers (such as the production tubing, the well casing, and the surrounding cement sheath) is important to ensure safe operation of the well and avoid blow-out incidents or leakage of hydrocarbons to the environment. Leaks in the well barriers can in principle be detected based on underground fluid flows (e.g., of oil or gas) in and around a wellbore. Monitoring downhole flows around wellbores, such as injected water, can further be of interest in reservoir characterization.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIGS. 9A-9C compare the accuracy of (A) a stationary sensor array with fixed time independent modelled steering vector weights, (B) a moving sensor array with fixed time independent modelled steering vector weights, and (C) a moving sensor array with adaptive time dependent modelled steering vector weights where the source frequency (47 kHz) is significantly greater than the spatial aliasing frequency.

DETAILED DESCRIPTION

Figure 1:
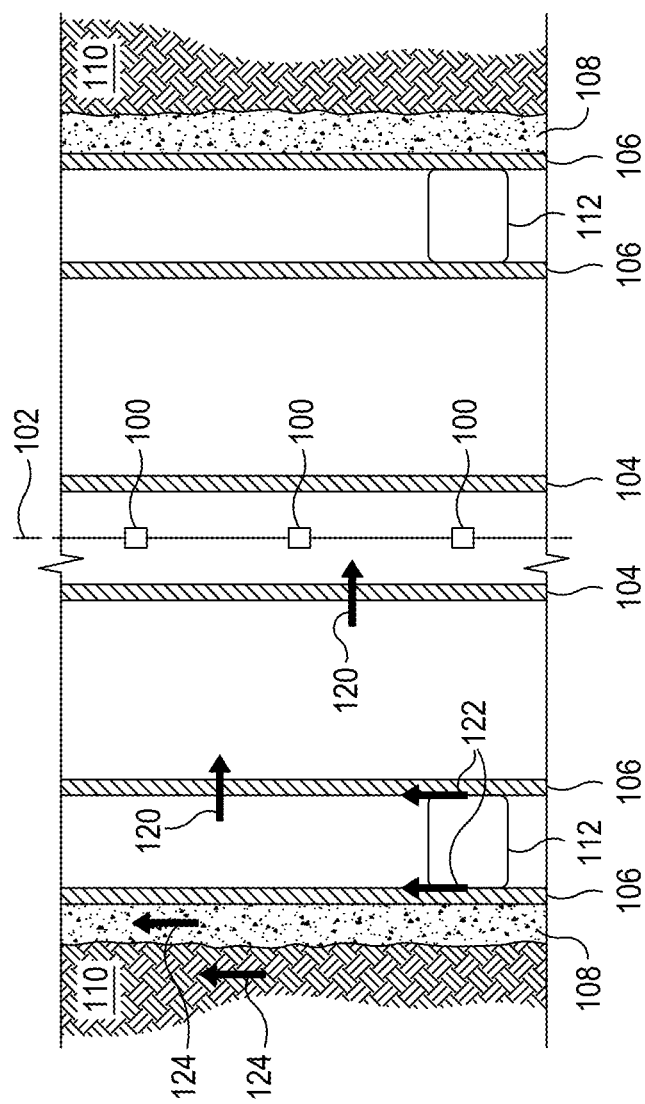
FIG. 1 illustrates an example acoustic sensor array deployed within a wellbore.

The present application relates to wellbore leak detection. Underground fluid flows generally emit acoustic signals that can be measured, for example, with fiber cables disposed along the wellbore or with acoustic point sensors such as Fiber Bragg Grating (FBG) sensors or hydrophones. Existing methods are, however, very limited in the accuracy and precision with which a detected fluid flow can be localized. Further, existing methods typically assume or require that the tool is relatively stationary while recording acoustic signals from the fluid flows. However, in practice, the tool is preferably moving through the wellbore typically at a fixed speed of about 20 ft/min to about 30 ft/min.

The exemplary embodiments described herein include tools, systems, and methods for detecting one or more underground acoustic sources and localizing them in depth and radial distance from a wellbore using an array of at least three acoustic sensors (also referred to herein as a "sensor array") within the wellbore in conjunction with array-signal-processing that accounts for movement of the acoustic sensors and spatial aliasing by using adaptive time dependent modelled steering vector weights. Acoustic source detection and localization in accordance herewith may be employed, in particular, to find underground fluid flows (e.g., resulting from leaks in the well barriers) from which the acoustic signals emanate.

As used herein, the term "depth" herein generally refers to a coordinate along the direction of a borehole, regardless whether the borehole extends vertically into the formation or is tilted with respect to the vertical direction. As used herein, the term "radial distance" refers to a direction perpendicular to and away from the longitudinal wellbore axis.

As used herein, the term "array-signal-processing" generally refers to techniques for estimating or calculating parameters of one or more signal sources (such as the source locations and emitted waveforms) by fusing data collected by sensor array with known geometric relations either substantially simultaneously or, more generally, with known temporal relations between the different sensor signals. As used herein, the term "substantially simultaneously" relative to time intervals indicates that the time intervals over which signals are collected overlap significantly (e.g., by at least 90%, preferably at least 99%) between the different sensors.

Array-signal-processing techniques include, but are not limited to, various spatial filtering methods, such as conventional beamforming, Capon's beamforming, Multiple Signal Classification (MUSIC), and various parametric methods, as well as time-delay estimation. Array-signal-processing generally relies on a forward model of wave propagation from the source(s) to the sensors to solve the inverse problem (e.g., source localization). In traditional application contexts, such as radar and sonar, this forward model is generally straightforward because wave propagation occurs in a uniform (homogenous and isotropic) medium (e.g., air or water) and the source can be assumed to be far away from the sensors. However, when fluid flows in and surrounding a wellbore are to be measured, the uniform-medium and far-field assumptions break down. Accordingly, in various embodiments, the forward model is adjusted to account for the configuration and condition of the wellbore and surrounding formation (which collectively include various propagation media and boundaries therebetween) and their effect on the wave field (e.g., wave refractions, reflections, and resonances), as well as to facilitate the processing of near-field signals (i.e., signals originating from a source whose distance from the sensors is not significantly (e.g., orders of magnitude) larger than the spatial extent of the sensor array).

Implementing array-signal-processing involves, in accordance with some embodiments, fusing the signals received by the individual sensors of the array for a plurality of putative source locations within a predefined two-dimensional region (that, e.g., spans a certain length in the depth direction and extends to a certain radial distance from the borehole) to thereby compute a two-dimensional map of an acoustic source energy level, amplitude, or other fused-signal parameter as a function of depth and radial distance. The actual source location(s) can be determined from this map by identifying the local maximum (or multiple local maxima) of the acoustic source energy level or other parameter. The magnitude of the local maximum can be used to infer whether the identified acoustic source indeed corresponds to an underground flow. For instance, in some embodiments, acoustic signals are acquired under multiple flow and non-flow conditions to establish a statistical detection threshold for flows for use in a binary-hypothesis test or similar statistical test.

FIG. 1 illustrates an example of a moving acoustic sensor array deployed within a wellbore, in accordance with various embodiments. As shown, the sensors 100 may be arranged linearly along the longitudinal axis 102 of the wellbore (whose radial coordinate is zero). They may be uniformly spaced (as shown), or have varied spacing between adjacent sensors. The sensor environment generally includes multiple physical barriers to fluid flow, such as the production tubing 104 through which oil or gas may be pumped up and out of the well, one or optionally multiple nested well casings 106, and a cement sheath 108 filling the space between the casing(s) 106 and the formation 110 surrounding the wellbore. Additionally, the wellbore may be divided into multiple vertical sections, e.g., by packers 112 between the casings 106 that may separate, e.g., a lower, perforated portion of the tubing where hydrocarbons enter from an upper (non-perforated) portion serving as an upward conduit. Unintended flow scenarios that may occur in this exemplary downhole configuration may include, but are not limited to, flows across the casing 106 or tubing 104 due to cracks or holes therein (indicated by arrows 120), flows past a packer 112 between adjacent vertical wellbore sections due to insufficient sealing (indicated by arrows 122), and flows within the formation 110, cement sheath 108, or other layer more or less parallel to the layer boundaries (indicated by arrows 124). As flows pass through restricted paths, acoustic signals may be generated as a result of the accompanying pressure drops. The acoustic signals propagate generally in all directions through the formation and/or borehole and may be detected at the various sensor locations.

Acoustic sensors 100 suitable for use in embodiments hereof include, for example and without limitation, (piezoelectric) hydrophones, FBG sensors, or segments of a distributed fiber-optic cable. In various embodiments, the acoustic sensors are omnidirectional, i.e., unable to discriminate by themselves between different incoming directions of the signal. By exploiting the spatiotemporal relations between the signals received from the same source at multiple sensors, however, information about the signal direction and/or source location can be obtained. For example, by using at least three sensors in a linear arrangement along the wellbore axis, as shown in FIG. 1, it is possible, at least under certain conditions, to determine the depth and radial distance of the source (as further explained below). To further localize the source in the azimuthal direction, the configuration of the sensor array may be modified, e.g., by placing different sensors at different radial positions or otherwise arrange them two- or three-dimensionally, by partially shielding sensors to limit their detection to certain azimuthal windows (different ones for different sensors) while rotating the partially-shielded sensors to cover the whole azimuthal region, or by using directional sensors (i.e., sensors that inherently provide directional information). A linear configuration as shown in FIG. 1 may be the consequence of the spatial confines imposed by the tubing 104 in which the sensors are mounted.

Figure 2:
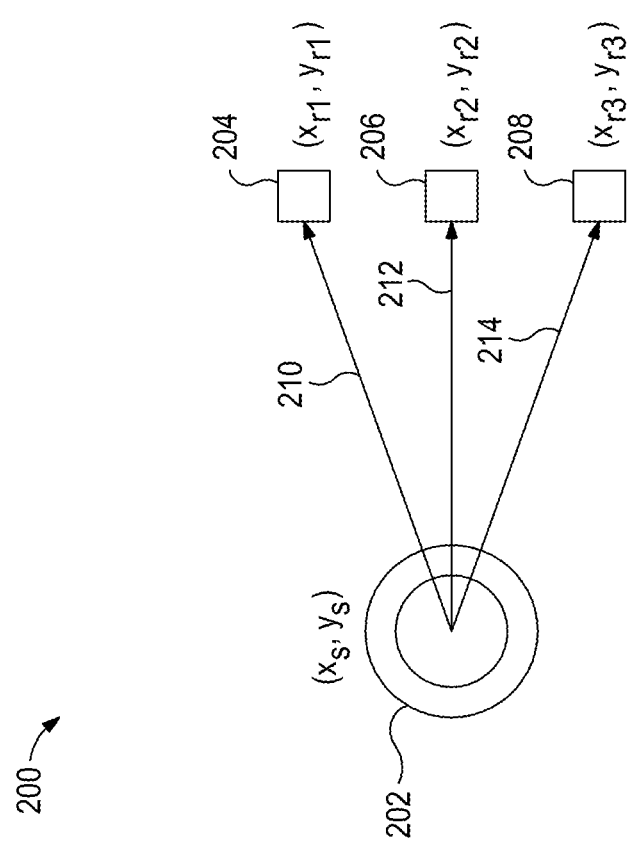
FIG. 2 illustrates, at a high conceptual level, how an acoustic source can be located in two dimensions.

FIG. 2 illustrates, at a high conceptual level 200, how an acoustic source 202 (e.g., a fluid flow) can be located in two dimensions (e.g., radial distance x and depth y) based on the signals received simultaneously with multiple sensors 204, 206,208 (illustrated as three) at different locations R1, R2, and R3, respectively, provided the medium is uniform such that the signal travels from the source to the sensors along straight lines (without undergoing, for example, refraction or reflection) and at a known, constant speed of sound v. In this case, the travel time t of the signal from the source to a sensor is simply the ratio of the distance d 210,212,214 between source 202 and sensors 204,206,208, respectively, to the v. As will be readily appreciated by those of ordinary skill in the art, the absolute t cannot be measured in the passive flow-detection methods described herein because the acoustic signal does not have a known starting point in time (as the flow typically commences long before the measurements take place and, in any case, at an unknown time). However, the time delay $\Delta t_{ij}=t_i-t_j$ between the receipt of a certain signal feature (e.g., a peak in the temporal wave form) at a first sensor i and receipt of the same feature at a second sensor j (i.e., the relative phase shift) can in principle be determined with EQS. 1 and 2.

$$t_i = \frac{d_i}{v} = \frac{\sqrt{(x_s - x_{ri})^2 + (y_s - y_{ri})^2}}{v} \quad \text{EQ. 1}$$

$$\Delta t_{ij} = \quad \text{EQ. 2}$$
$$t_i - t_j = \frac{\sqrt{(x_s - x_{ri})^2 + (y_s - y_{ri})^2} - \sqrt{(x_s - x_{rj})^2 + (y_s - y_{rj})^2}}{v}$$

With known sensor locations (R1 at $(x_{ri}, y_{ri})$, R2 at $(x_{r2}, y_{r2})$ and R3 at $(x_{r3}, y_{r3})$) and a known v, this time delay yields a nonlinear equation containing two unknowns, namely the coordinates $(x_s, y_s)$ of the source s. A second time delay measured between one of the sensors i or j and the third sensor k provides a second, independent nonlinear equation. From these two equations, the two-dimensional source location can be calculated straightforwardly in a manner known to those of ordinary skill in the art. If the v is unknown and/or changes as the signal propagates through different media, an array with a larger number of sensors (e.g., four or more sensors) may be used to provide sufficient information to localize the source.

In the more complex scenarios typically encountered in flow-detection applications as contemplated herein, signal processing generally takes a more complex form. In various embodiments, an array-signal-processing method (such as spatial-filtering) may be employed to fuse the various simultaneously acquired sensor signals and localize the acoustic source.

In some instances, the array-signal-processing technique may comprise at least one of spatial filtering, time delay estimation, or a sound-energy method.

Figure 3:
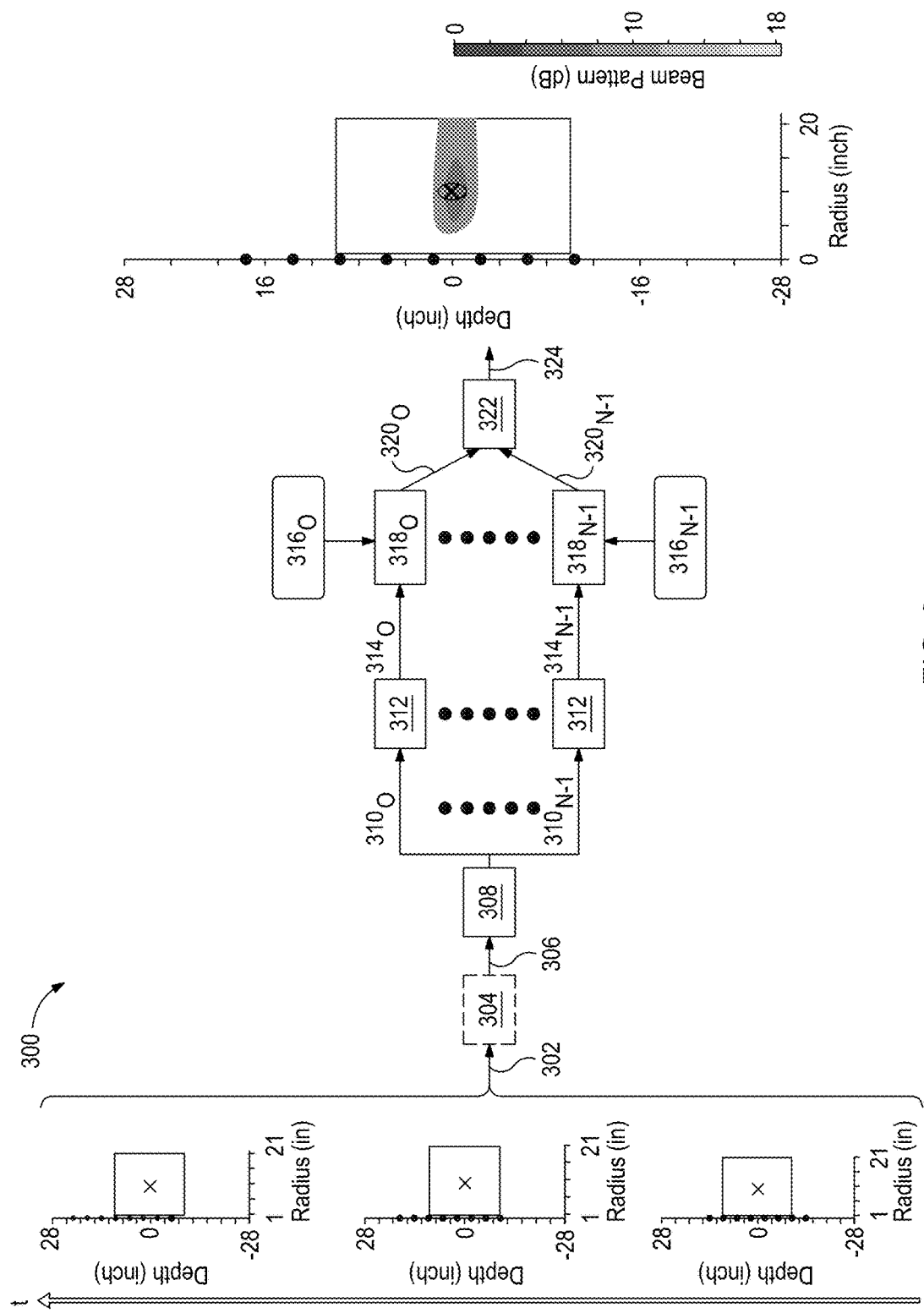
FIG. 3 depicts an overall block diagram of a continuous beamforming method that uses adaptive time dependent modelled steering vector weights.

FIG. 3 provides an overview of an exemplary array-signal-processing technique 300 that uses adaptive time dependent modelled steering vector weights 316 according to some embodiments of the present application. For example, a narrowband, far-field acoustic source ("s(t)") may be used, as described herein, to illustrate the principles underlying spatial filtering methods of the present disclosure.

Mathematically, the signal 302 captured using a static sensor array placed along the y-axis (i.e., along the longitudinal axis 102 of the wellbore of FIG. 1) may be optionally normalized by applying a normalization operation 304 to produce a received signal $p_m(t)$ 306 at the mth sensor with signals from K leaking source, $s_1(t), \ldots, s_K(t)$. Given that there are M sensors in the sensor array with inter-sensor spacing d, the received signal 306 vector of each sensor may be expressed as EQ. 3.

$$p_m(t) = \Sigma_{k=1}^{K} a_m(r_{s_k}) s_k(t) + q_m(t), \qquad \text{EQ. 3}$$

where $a_m(r_{s_k})$ is the transfer function of the kth source propagating towards the mth sensor, $r_{s_k} = (x_{s_k}, y_{s_k})$ is a vector denoting the position of the kth impinging source, $s_k(t)$ is the magnitude of the kth impinging source, and $q_m(t)$ is the additive white Gaussian noise that captures the effects of thermal and environmental noise.

The received signal $p_m(t)$ 306 for all the sensors may also be represented in the vector form p(t) defined as EQ. 4.

$$p(t) = [p_1(t) \ldots p_m(t) \ldots p_m(t)]^T = As(t) + q(t), \qquad \text{EQ. 4}$$

where $$s(t) = [s_1(t) \ldots s_m(t) \ldots s_K(t)]^T,$$

$$A = [a(r_{s_1}) \ldots a(r_{s_K})],$$

$$q(t) = [q_1(t) \ldots q_M(t)]^T,$$

$$a(t) = [a_1(r_{s_k}) \ldots a_m(r_{s_k})]^T, \text{ and}$$

$(.)^T$ denotes the transpose operation.

With EQ. 4 the theoretical covariance matrix R of the static sensor array model has the following form.

$$R = AE\{s(t)s^H(t)\}A^H + \sigma_q I, \qquad \text{EQ. 5}$$

where $E\{.\}$ denotes the expectation operation, $(.)^H$ denotes the Hermitian transpose operation, and $\sigma_q$ is the assumed noise power with I being the identity matrix.

In practical applications, the theoretical covariance matrix R may be replaced with a sample covariance matrix $\hat{R}$ computed using EQ. 6.

$$\hat{R} = \frac{1}{\Delta T} \int_{t=0}^{t=\Delta T} p(t) p^H(t) dt. \qquad \text{EQ. 6}$$

where $\Delta T$ is the duration of the captured received signal 306 for the array.

Conventionally, localization of static sensor array can be achieved by constructing the spatial spectrum $\beta(r_j)$ and searching for the peaks. The peaks are used as the likelihood of the sources' location. By letting $\mathcal{R} = \{r_1 \ldots r_L\}$ denote the set that contains the grid location in which the spatial scanning is performed, then for each location, the fixed time independent modelled steering vector weights $a(r_j)$ where $r_j \in \mathcal{R}$ is first computed, before the standard Capon spatial spectrum $\beta(r_j)$ is estimated by EQ. 7.

$$\beta(r_j) = \frac{1}{a^H(r_j) \hat{R}^{-1} a(r_j)}. \qquad \text{EQ. 7}$$

Ideally, if the array is stationary, the local maximum will occur at $r_j = r_{s_k}$ when the steering vector weight $a(r_j)$ matches well with the covariance matrix $\hat{R}$.

However, when the sensor array is moving at a constant velocity v, the received signal 306 in the duration of $\Delta T$ will produce a covariance matrix $\hat{R}$ that no longer matches with the steering vector weight $a(r_j)$ of the stationary model in EQ. 5. Specifically, the relative displacement caused by the motion at time t ($0 \leq t \leq \Delta T$) can be modeled as $\Delta r = v \Delta T$. In this case, the received signal 306 from the K sources can be expressed as:

$$p(t, \Delta r) = \Sigma_{k=1}^{K} a(r_{s_k} + \Delta r) s_k(t) + q(t) = A(\Delta r) s(t) + q(t) \qquad \text{EQ. 8}$$

where $A(\Delta r) = [a(r_{s_1} + \Delta r) \ldots a(r_{s_k} + \Delta r)]$.

Given the moving sensor array, the present application aims to localize the leak source position $r_{s_k} = (x_{s_k}, y_{s_k})$ where $k = \{1, \ldots, K\}$ by the following analysis of the received signal 306.

When the theoretical covariance matrix from the received signal vector in EQ. 8 is denoted as $R(\Delta r)$, EQ. 9 is derived.

$$R(\Delta r) = E\{p(t, \Delta r) p^H(t, \Delta r)\} = A(\Delta r) E\{s(t) s^H(t)\} A^H(\Delta r) + \sigma_q I. \qquad \text{EQ. 9}$$

As t, v or the signal frequency increases (shorter wavelength), the difference between $A(\Delta r)$ and A increases as well. Hence, direct application of EQ. 7 using the covariance matrix generated in the duration $\Delta T$ with EQ. 9 will result in mismatch in its steering vectors. One ad hoc approach to address the mismatch is to shorten the acquisition duration $\Delta T$ of EQ. 6 until the stationary condition is preserved. Practically, this can be achieved by truncating $\Delta T$ and using fixed weight time-independent modelled steering vector, which is a Capon spatial spectrum construction operation 318, described further herein.

However, to resolve the mismatch issue effectively, the solution is provided by dividing the received signal 306 recorded within acquisition window $\Delta T$ into multiple frames. Generally, when a frame decomposition operation 308 is applied to the received signal 306, the received signal 306 decomposes into N equal shorter decomposed frames $310_0 \ldots 310_{N-1}$ in which the stationary condition is preserved. Then each of the decomposed frames $310_0 \ldots 310_{N-1}$ represents one virtual array. From the N sets of decomposed frames $310_0 \ldots 310_{N-1}$, the corresponding theoretical covariance matrices $R(n\Delta r)$ may be represented by EQ. 10.

$$\{R(0) R(\Delta r) \ldots R(n\Delta r) \ldots R((N-1)\Delta r)\}. \qquad \text{EQ. 10}$$

Applying a sample covariance matrix estimator $312_0 \ldots 312_{N-1}$ (EQ. 11) to each of the decomposed frames $310_0 \ldots 310_{N-1}$ converts each of the decomposed frames $310_0 \ldots 310_{N-1}$ to a sample covariance matrix $314_0 \ldots 314_{N-1}$ ($\{\hat{R}(0) \hat{R}(\Delta r) \ldots \hat{R}(n\Delta r) \ldots \hat{R}((N-1)\Delta r)\}$).

$$\hat{R}(n\Delta r) = \frac{N}{\Delta T} \int_{t=n\Delta T/N}^{t=(n+1)\Delta T/N} p(t, n\Delta r) p^H(t, n\Delta r). \qquad \text{EQ. 11}$$

By applying the Capon spatial spectrum construction operation $318_0 \ldots 318_{N-1}$ (EQ. 12) with the adaptive time dependent modelled steering vector weights $316_0 \ldots 316_{N-1}$ to any single sample covariance matrix $\hat{R}(n\Delta r)$ $314_0 \ldots$ $314_{N-1}$, the Capon spatial spectrum response ($\beta^{(n)}(r_j)$) $320_0 \ldots 320_{N-1}$ for each of the frames is produced, which can be searched for the peak signals corresponding to the source location.

$$\beta^{(n)}(r_j) = \frac{b_n}{a^H(r_j + n\Delta r)\hat{R}^{-1}(n\Delta r)a(r_j + n\Delta r)} \quad \text{EQ. 12}$$

where $b_n$ is the weight factor of each nth frame and $a(r_j+n\Delta r)$ is the adaptive time dependent modelled steering vector weights $316_0 \ldots 316_{N-1}$.

Although any individual Capon spatial spectrum response $\beta^{(n)}(r_j)$ $320_0 \ldots 320_{N-1}$ may be used to search for the source location $r_{s_k}=(x_{s_k}, y_{s_k})$, the Capon spatial spectrum construction operation $318_0 \ldots 318_{N-1}$ may be prone to spatial aliasing that produces side-lobe peaks in the Capon spatial spectrum response $320_0 \ldots 320_{N-1}$, which may be falsely identified as source locations. To reduce the intensity of side-lobes, a weighted average Capon spatial spectrum response $\beta_{moving}(r_j)$ 324 is calculated by performing a summation and normalization operation 322 (EQ. 13) on the Capon spatial spectrum response $320_0 \ldots 320_{N-1}$. Because the side-lobes are not consistently located in each of the Capon spatial spectrum, response $320_0 \ldots 320_{N-1}$, the summation and normalization operation 322 causes the intensity side-lobe peaks to be reduced and the intensity of the source location to be enhanced.

$$\beta_{moving}(r_j) = \frac{1}{N}\sum_{n=0}^{N-1} \beta^{(n)}(r_j) \quad \text{EQ. 13}$$

In some instances, the acoustic signals from the acoustic sources may have a higher frequency than a spatial aliasing frequency used in the array-signal-processing technique. Alternatively, the acoustic signals may have a lower frequency than a spatial aliasing frequency used in the array-signal-processing technique. For example, to prevent spatial aliasing, the inter-sensor spacing may be d≤λ/2. Where λ is the wavelength of the impinging signal. However, as the array is designed with a fixed inter-sensor spacing d, it may suffer from spatial aliasing effect when the wavelength of the impinging signal is λ/2≤d.

In some instances, EQ. 11 may be used to bound the design of $\Delta T_n = \Delta T/N$, where: when the array is only moving along the z-axis at a velocity $v=v_z$, then $\Delta T_n$ may be approximated as stationary if the difference between radial distance of $n\Delta T$ and $(n-1)\Delta T$ is bounded within 1%. The 1% bound constraint may be mathematically expressed as EQ. 14.

$$\Delta T_n \leq \frac{0.01|r_j|}{v_z} \quad \text{EQ. 14}$$

Figure 4:
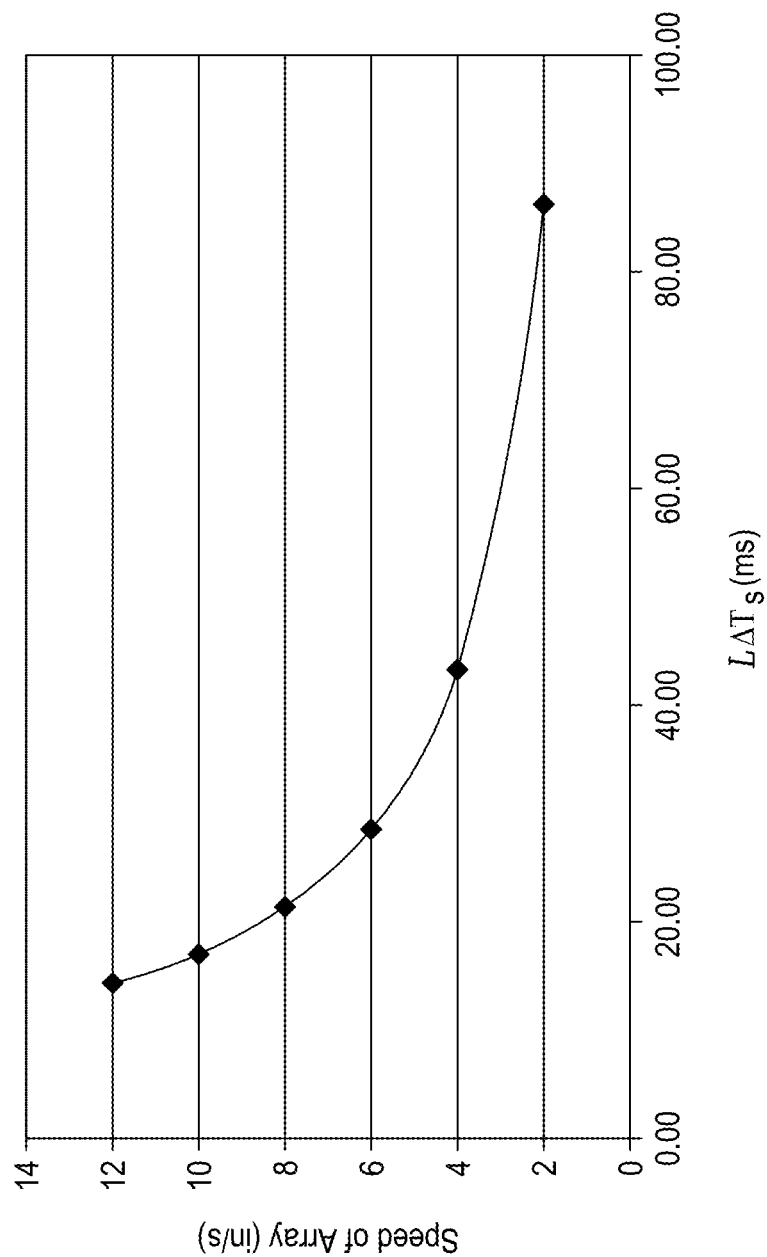
FIG. 4 is an illustrative graph depicting the exemplary $\Delta T_n$ for different array speeds.

FIG. 4 is an illustrative graph depicting the exemplary $\Delta T_n$ for different array speeds with a 1% bound.

The methods described herein may be implemented by a set of instructions that cause a processor to perform the array-signal-processing technique described herein that includes an adaptive time-dependent modelled steering vector to determine a depth and a radial distance from the wellbore of the acoustic source.

The processor may be a portion of computer hardware used to implement the various illustrative blocks, modules, elements, components, methods, and algorithms described herein. The processor may be configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to the processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Figure 5:
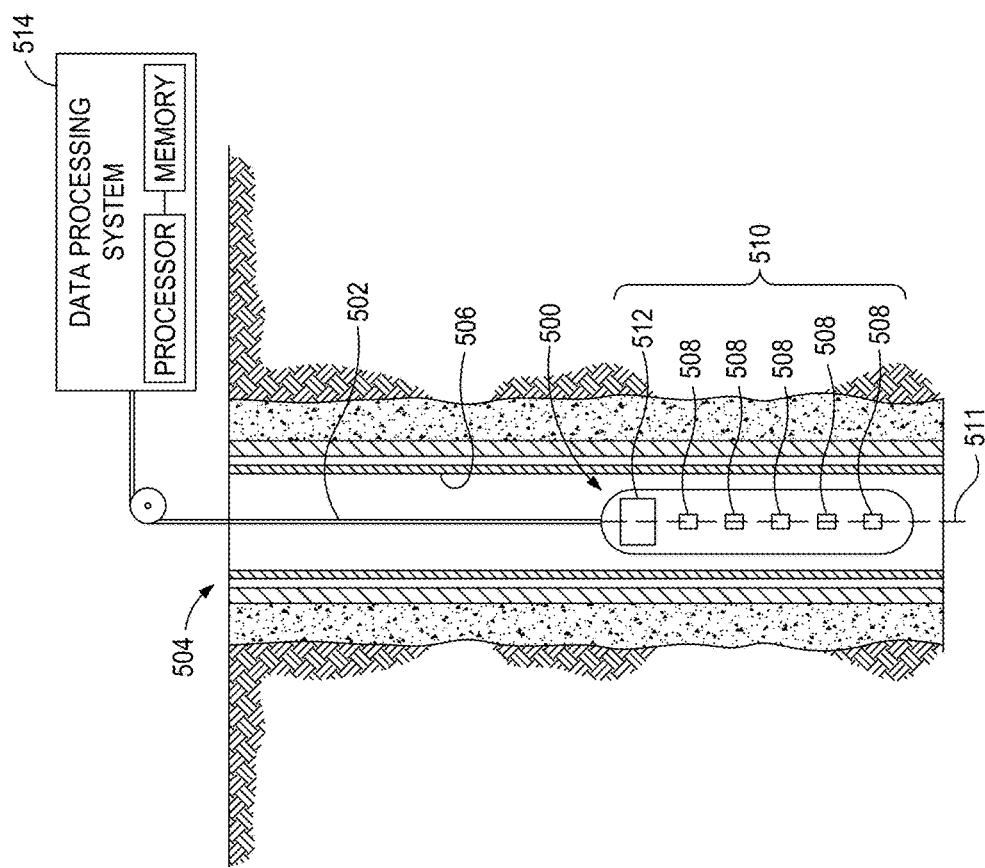
FIG. 5 illustrates an example wireline well-logging system. The system includes a sonde tool suspended from a wireline inside a cased wellbore.

The detection and localization of underground acoustic sources (and, thus, underground fluid flows) in accordance herewith can be implemented in both wireline and measuring-while-drilling (MWD) logging operations. FIG. 5 illustrates an example wireline well-logging system. The system includes a sonde tool 500 suspended from a wireline 502 inside a cased wellbore 504.

Figure 6:
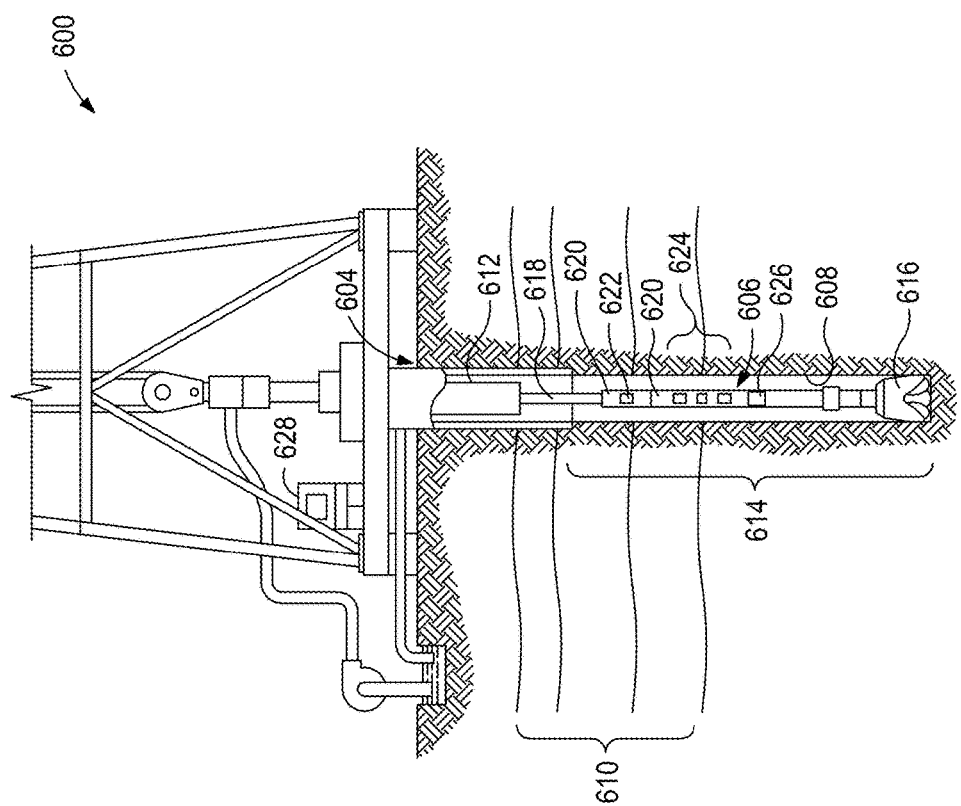
FIG. 6 illustrates a system for detecting and localizing underground acoustic sources implemented in a drilling system for MWD logging operations.

In various embodiments, the tool 500 is used inside the production tubing 506 through which hydrocarbons are pumped out of the wellbore 504. The tool 500 includes a plurality of (at least three) acoustic sensors 508 (such as, e.g., hydrophones), e.g., arranged in a linear array 510 along a longitudinal axis 511 of the tool 500 and, thus, of the wellbore 504. Further, the tool may include suitable control and processing circuitry 512, which may, in turn, be in communication (e.g., via a wired connection or a telemetry system) with a surface data-processing system 514. The data-processing facility providing the computational functionality for processing and fusing the acoustic signals received by the individual sensors 508 and detecting and localizing flows based thereon may be implemented by either one of the control and processing circuitry 512 or the data-processing system 514, or by both in combination. For example, in some embodiments, the control and processing circuitry 512 pre-processes the individual sensor signals (e.g., through signal conditioning, filtering, and/or noise cancellation) and transmits them to the surface data-processing system 514, where the fused signal map is computed, and any flow-induced acoustic sources are detected and localized based thereon. Each of the control and processing circuitry 512 and the surface data-processing system 514 may generally be implemented in hardware, software, or a combination thereof, such as with a suitably programmed general-purpose or special-purpose computer including, e.g., a processor and associated memory (as shown in FIG. 6). In various embodiments, the processed acoustic signals are evaluated in conjunction with measurements from other sensors (e.g., temperature and surface well-pressure measurements) to evaluate flow conditions and overall well integrity.

Alternative sensor configurations may be employed to support acoustic source detection in a wireline logging operation. For example, in some embodiments, a distributed fiber optic cable is used in place of acoustic point sensors. The fiber optic cable can be permanently installed in the wellbore, e.g., clamped behind the casing or embedded in the cemented annulus. A channel, corresponding to a segment of the fiber-optic cable, can be scanned optically to detect surrounding acoustic signals. In this configuration, different channels at different depths correspond to different acoustic sensors.

Using a wireline logging tool 500, the acoustic sensor array can search, at a given depth of logging, a predefined two-dimensional space, for example, the array aperture length in the depth direction and a few feet into the formation in the radial direction. This search can be repeated as the array moves to another depth of logging. Thus, within one pass of wireline logging, a region spanning the entire length of the well can be searched for flow-induced acoustic sources. In some embodiments, the acoustic sensor array is operated in a fast logging speed (e.g., at as much as 60 feet per minute) to detect flows initially with coarse spatial resolution. Once one or more flows have been detected at certain depths, regions at those depths can be relogged at a slower logging speed, or in stationary mode, to localize the flow(s) at a finer spatial resolution. In embodiments where an acoustic signal is emitted along an extended path (as opposed to from a point source), the whole flow path may be mapped out in a two-dimensional space of depth and radial distance.

Turning now to FIG. 6 it can be seen that a system for detecting and localizing underground acoustic sources can also be implemented in a drilling system for MWD logging operations. This may be useful, e.g., to detect flows for the purpose of characterizing the formation and hydrocarbon reservoirs, and steer or otherwise adjust drilling based thereon.

As shown, the drilling system includes a drilling rig 600 located at the surface of a well 604 and, supported by the drilling rig 600, a drill string 606 for drilling a wellbore 608 through subsurface formations 610. The drill string 606 includes a drill pipe 612 and, generally located at the lower end of the drill pipe 612, a bottom hole assembly (BHA) 614. The BHA 614 may include the drill bit 616 and, disposed thereabove, one or more drill collars 618, 620, which may contain a number of different tools and instruments adapted for taking measurements during the drilling process. In accordance with various embodiments, these tool may include an acoustic sensor array 624 (e.g., including three or more linearly arranged sensors) and associated control and processing circuitry 626, and may be in communication with a surface data-processing system 628. Collectively, the acoustic sensor array 624 and the control and processing circuitry 626 and/or data-processing system 628 provide functionality for implementing the above-described methods.

The present disclosure includes Embodiments A-C.

Embodiment A is a method that comprises moving a sensor array comprising at least three sensors along a wellbore; substantially simultaneously measuring acoustic signals from an acoustic source with each of the at least three sensors; and processing the acoustic signals in combination using an array-signal-processing technique that uses adaptive time-dependent modelled steering vector weights to identify a location of the acoustic signal by a depth and a radial distance from the wellbore Embodiment B is a system that comprises a sensor array movable along a wellbore and comprising at least three acoustic sensors for substantially simultaneously measuring acoustic signals from an acoustic source and received thereat; and non-transitory computer-readable medium encoded with instructions that, when executed, perform operations: substantially simultaneously measuring acoustic signals from an acoustic source with each of at least three sensors in a sensor array moving along a wellbore; and processing the acoustic signals in combination using an array-signal-processing technique that includes an adaptive time-dependent modelled steering vector to determine a depth and a radial distance from the wellbore of the acoustic source.

Embodiment C is a non-transitory computer-readable medium encoded with instructions that, when executed, perform operations comprising: substantially simultaneously measuring acoustic signals from an acoustic source with each of at least three sensors in a sensor array moving along a wellbore; and processing the acoustic signals in combination using an array-signal-processing technique that includes an adaptive time-dependent modelled steering vector to determine a depth and a radial distance from the wellbore of the acoustic source.

Optionally, Embodiment A, B, or C may further include one or more of the following: Element 1: wherein the acoustic sensors form a linear array along a longitudinal axis of the wellbore; Element 2: wherein the array-signal-processing technique comprises at least one selected from the group consisting of spatial filtering, time delay estimation, and a sound-energy method; Element 3: wherein the acoustic sensors comprise one selected from the group consisting of: a omnidirectional hydrophone, a Fiber Bragg Grating sensor, fiber-optic cable, and any combination thereof; Element 4: the method or operations further comprising calculating an azimuthal position of the acoustic source; Element 5: wherein the acoustic signals have a higher frequency than a spatial aliasing frequency used in the array-signal-processing technique; Element 6: wherein the acoustic signals have a lower frequency than a spatial aliasing frequency used in the array-signal-processing technique; Element 7: wherein a stationary condition of the sensor array is preserved by satisfying $$\Delta T_n \leq \frac{0.01|r_j|}{v_z},$$

where $\Delta T_n$ is a duration of the acoustic signal, $r_j$ is a location of a first sensor of the at least three sensors, and $v_z$ is a velocity the first sensor is moving along the wellbore; Element 8: Element 7 and wherein the array-signal-processing technique comprises: applying data truncation operation to the acoustic signals to produce frames; applying a sample covariance matrix estimator to the frames to produce a sample covariance matrix; applying the Capon spatial spectrum construction operation using the fixed weight time-independent modelled steering vector weights to the sample covariance matrix to produce a Capon spatial spectrum response; and identifying the location of the acoustic signal based on the Capon spatial spectrum response; and Element 9: wherein the array-signal-processing technique comprises: applying a frame decomposition operation to the acoustic signals to produce decomposed frames; applying a sample covariance matrix estimator to the decomposed frames to produce a sample covariance matrix; applying a Capon spatial spectrum construction operation using the adaptive time-dependent modelled steering vector weights to the sample covariance matrix to produce a Capon spatial spectrum response; applying a summation and normalization operation to the Capon spatial spectrum response to produce a weighted average Capon spatial spectrum response; and identifying the location of the acoustic signal based on the weighted average Capon spatial spectrum response. Exemplary combinations include, but are not limited to: two or more of Elements 1-4 in combination; one or more of Elements 1-4 in combination with Element 5 or Element 6; one or more of Elements 1-4 in combination with Element 7 (and optionally Element 8) or Element 9; Element 5 or Element 6 in combination with Element 7 (and optionally Element 8) or Element 9; and combinations thereof.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present disclosure, the following examples of preferred or representative embodiments are given. In no way should the following examples be read to limit, or to define, the scope of the disclosure.

EXAMPLES

The methods, systems, and tools described herein enhance the Beamformer ability to detect and localize a signal having a frequency much higher than its spatial aliasing frequency limited by the physical array geometry. Results from simulations using this method showing the improvement are depicted in FIGS. 7A-7C, 8A-8C, and 9A-9C.

Figure 7A:
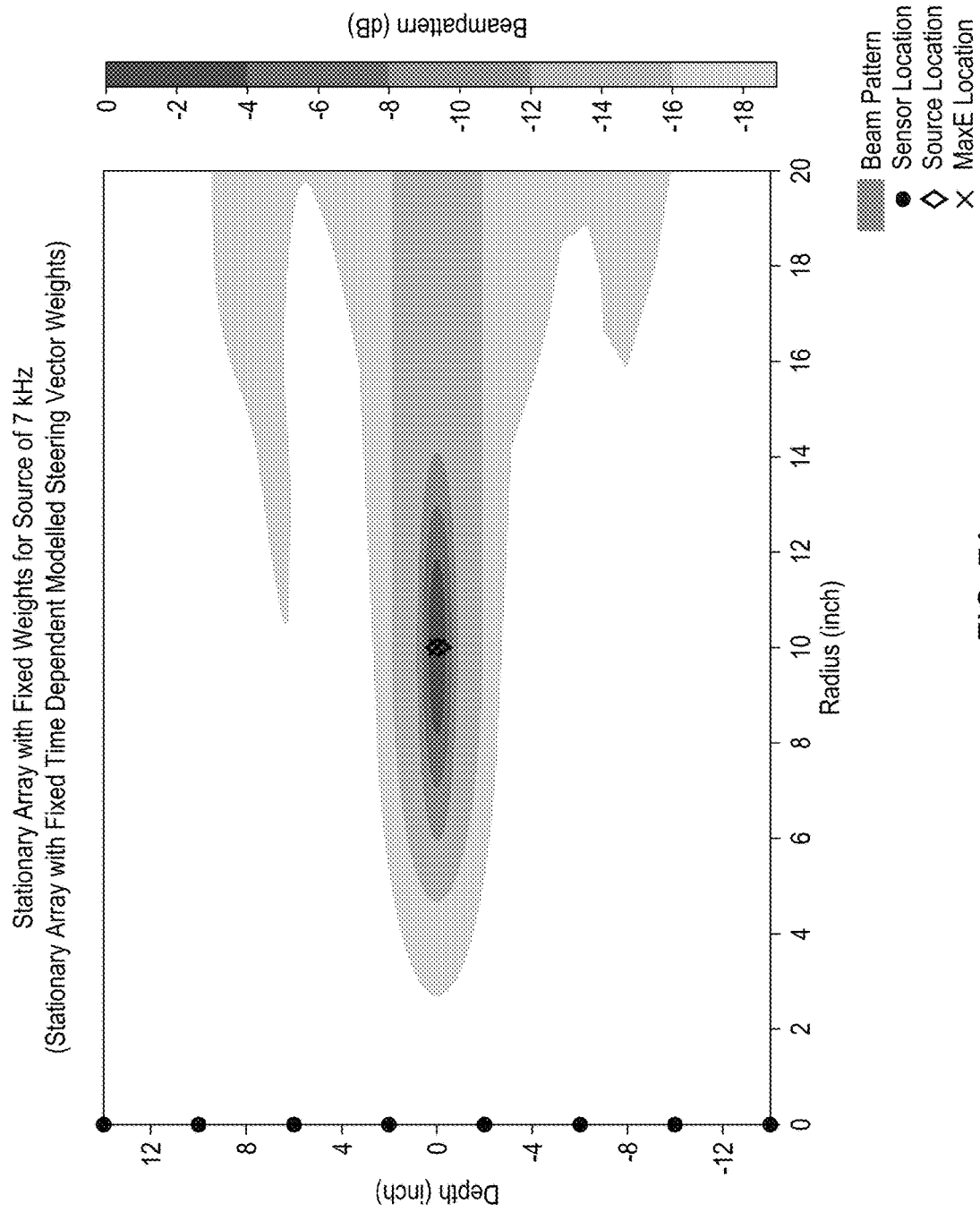
FIGS. 7A-7C compare the accuracy of (A) a stationary sensor array with fixed time independent modelled steering vector weights, (B) a moving sensor array with fixed time independent modelled steering vector weights, and (C) a moving sensor array with adaptive time dependent modelled steering vector weights where the source frequency (7 kHz) is less than the spatial aliasing frequency.
Figure 7B:
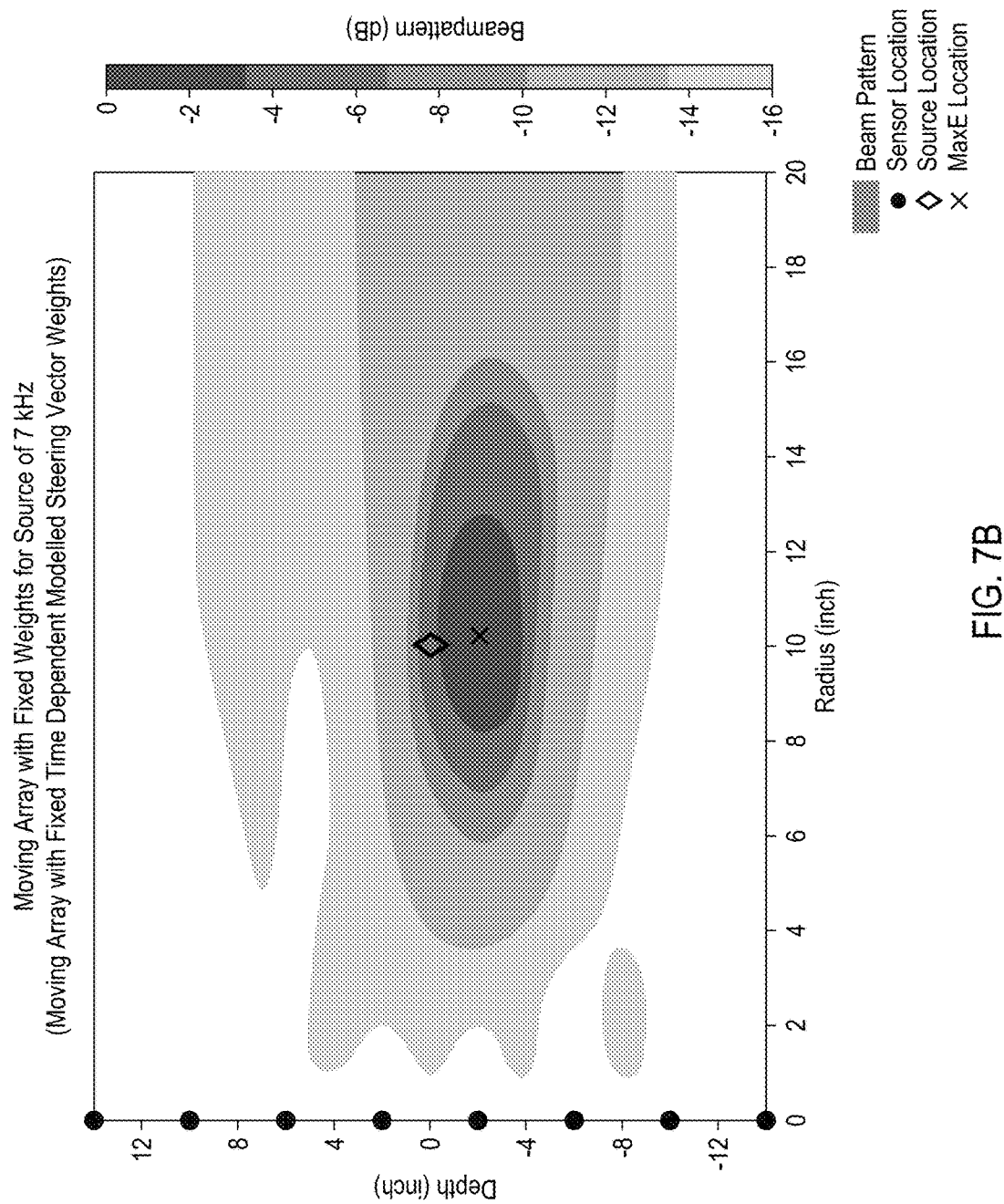
Figure 7C:
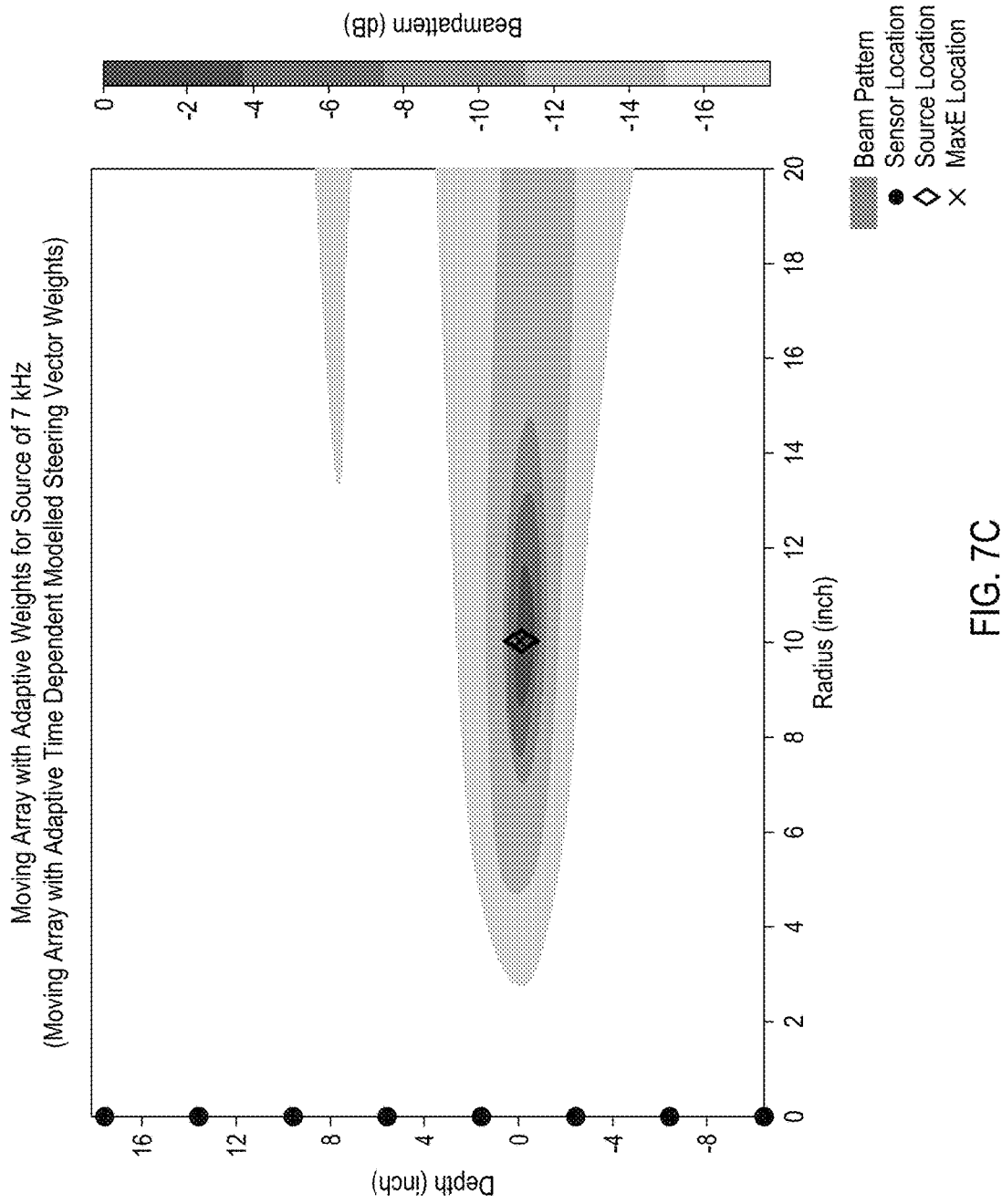

FIGS. 7A-7C compare the accuracy of (A) a stationary sensor array with fixed time independent modelled steering vector weights (conventional method), (B) a moving sensor array with fixed time independent modelled steering vector weights (conventional method), and (C) a moving sensor array with adaptive time dependent modelled steering vector weights (method of the present application) where the source frequency (7 kHz) is less than the spatial aliasing frequency.

FIG. 7B as compared to FIG. 7A illustrates that moving the array while computing with fixed time independent modelled steering vector weight Beamformer blurs the data. FIG. 7C illustrates that the methods, tools, and systems of the present disclosure that combine a moving array and adaptive time dependent modelled steering vector weight Beamformer produce an output for the acoustic source frequency commensurate in accuracy as the FIG. 7A conditions. Because in practice the sensor array will be moving, this example illustrates the accuracy and applicability of the exemplary methods, tools, and systems described herein.

Figure 8A:
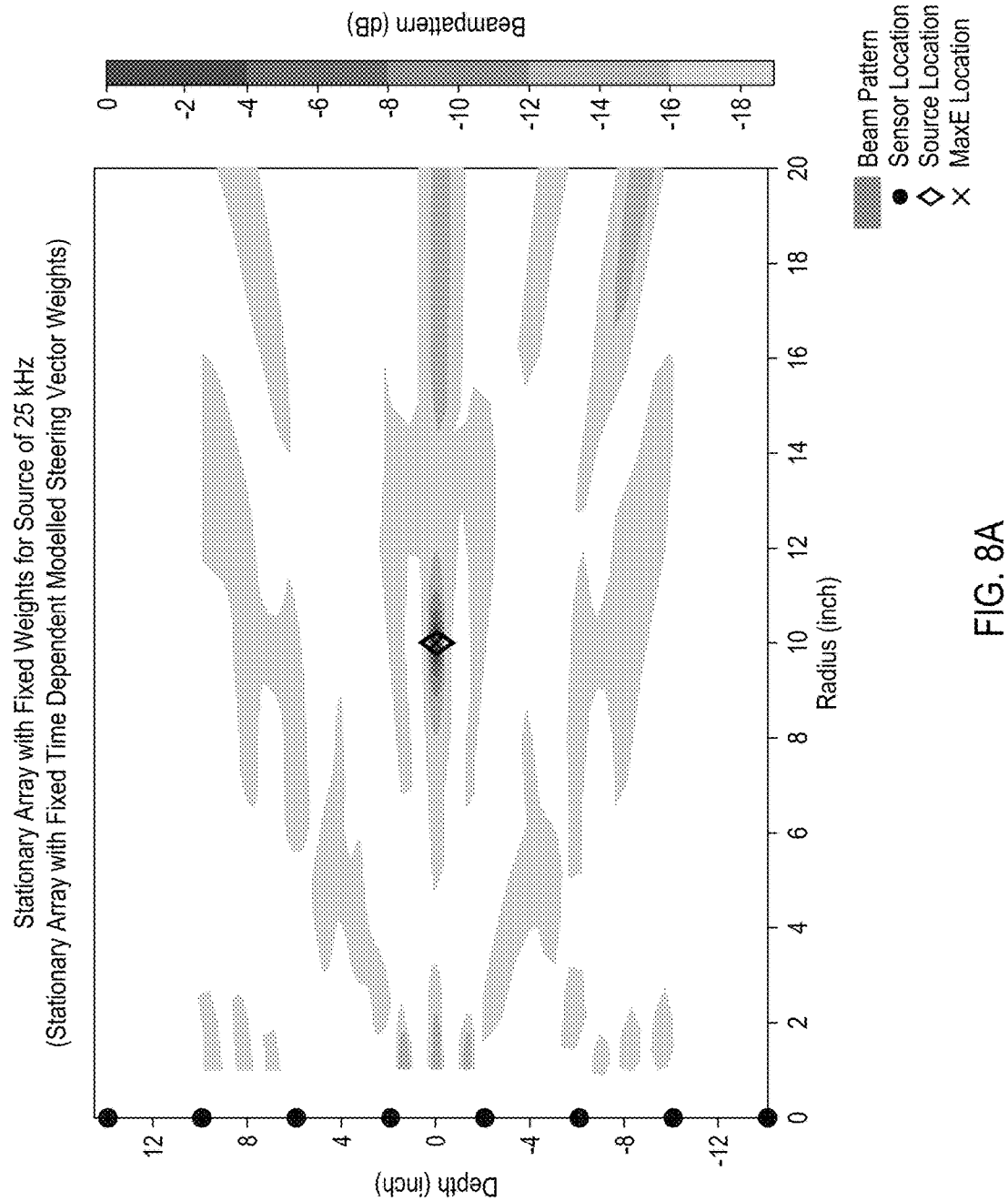
FIGS. 8A-8C compare the accuracy of (A) a stationary sensor array with fixed time independent modelled steering vector weights, (B) a moving sensor array with fixed time independent modelled steering vector weights, and (C) a moving sensor array with adaptive time dependent modelled steering vector weights where the source frequency (25 kHz) is greater than the spatial aliasing frequency.
Figure 8B:
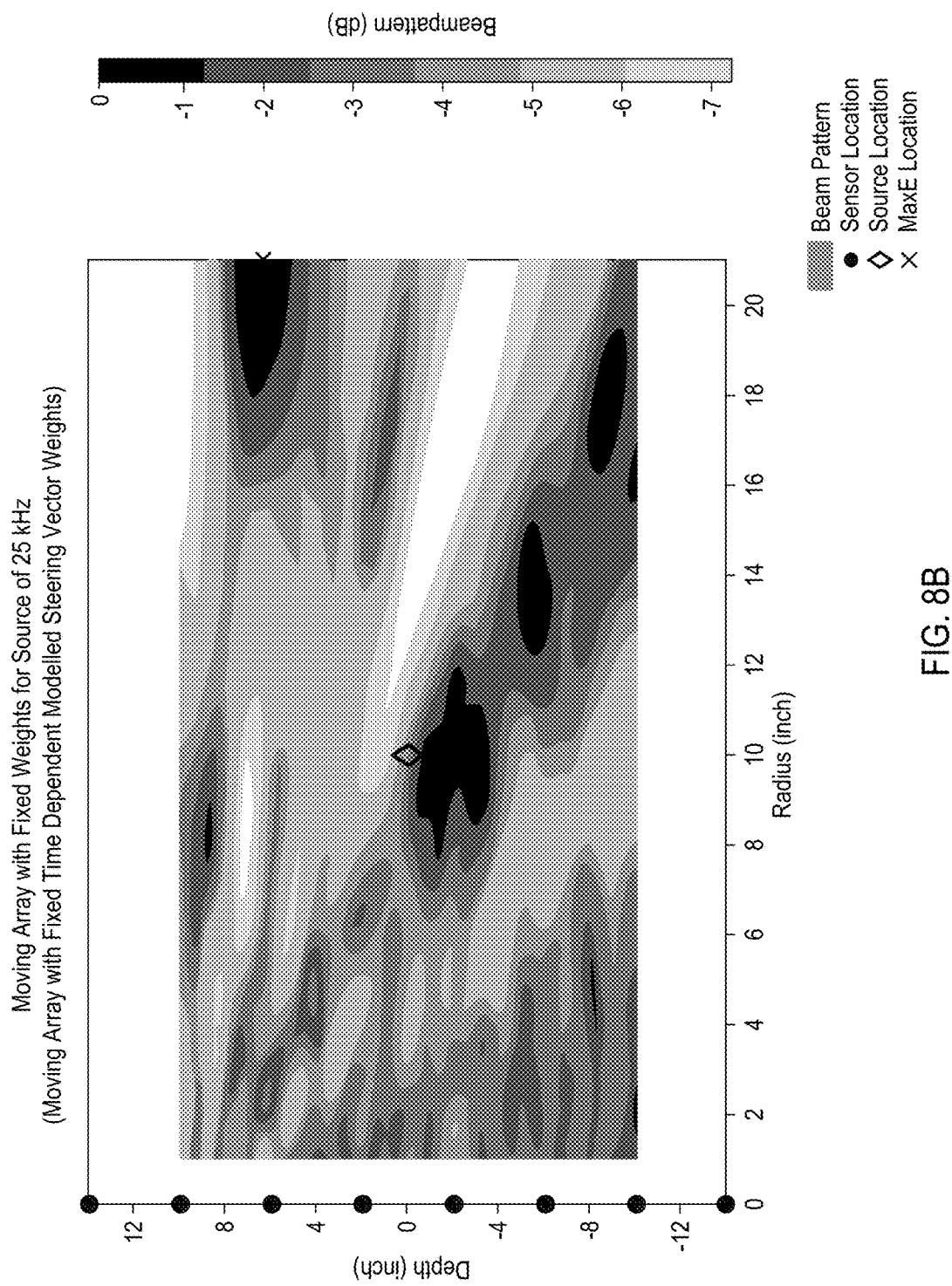
Figure 8C:
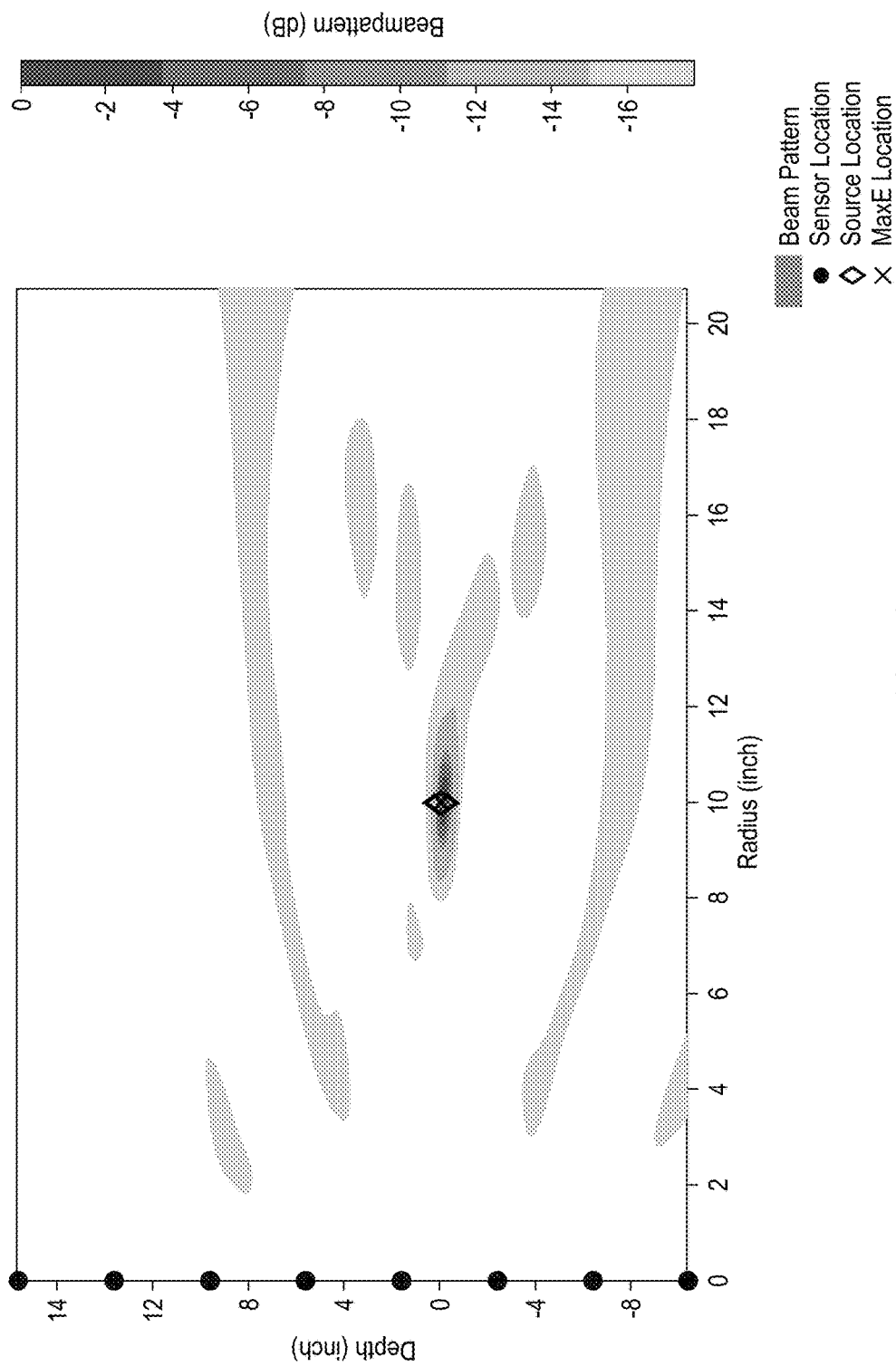

FIGS. 8A-8C compare the accuracy of (A) a stationary sensor array with fixed time independent modelled steering vector weights, (B) a moving sensor array with fixed time independent modelled steering vector weights, and (C) a moving sensor array with adaptive time dependent modelled steering vector weights where the source frequency (25 kHz) is greater than the spatial aliasing frequency.

Similar to the example illustrated in FIGS. 7A-7C, combining a moving array and adaptive time dependent modelled steering vector weight Beamformer produce an output for the acoustic source frequency commensurate in accuracy as the FIG. 8A conditions. In this example, however, the Beamformer output illustrated in FIG. 8B is no longer able to localize the acoustic source. This example illustrates that the exemplary methods, tools, and systems described herein are able to improve both the accuracy and reduce the Spatial Aliasing in leak detection.

Figure 9A:
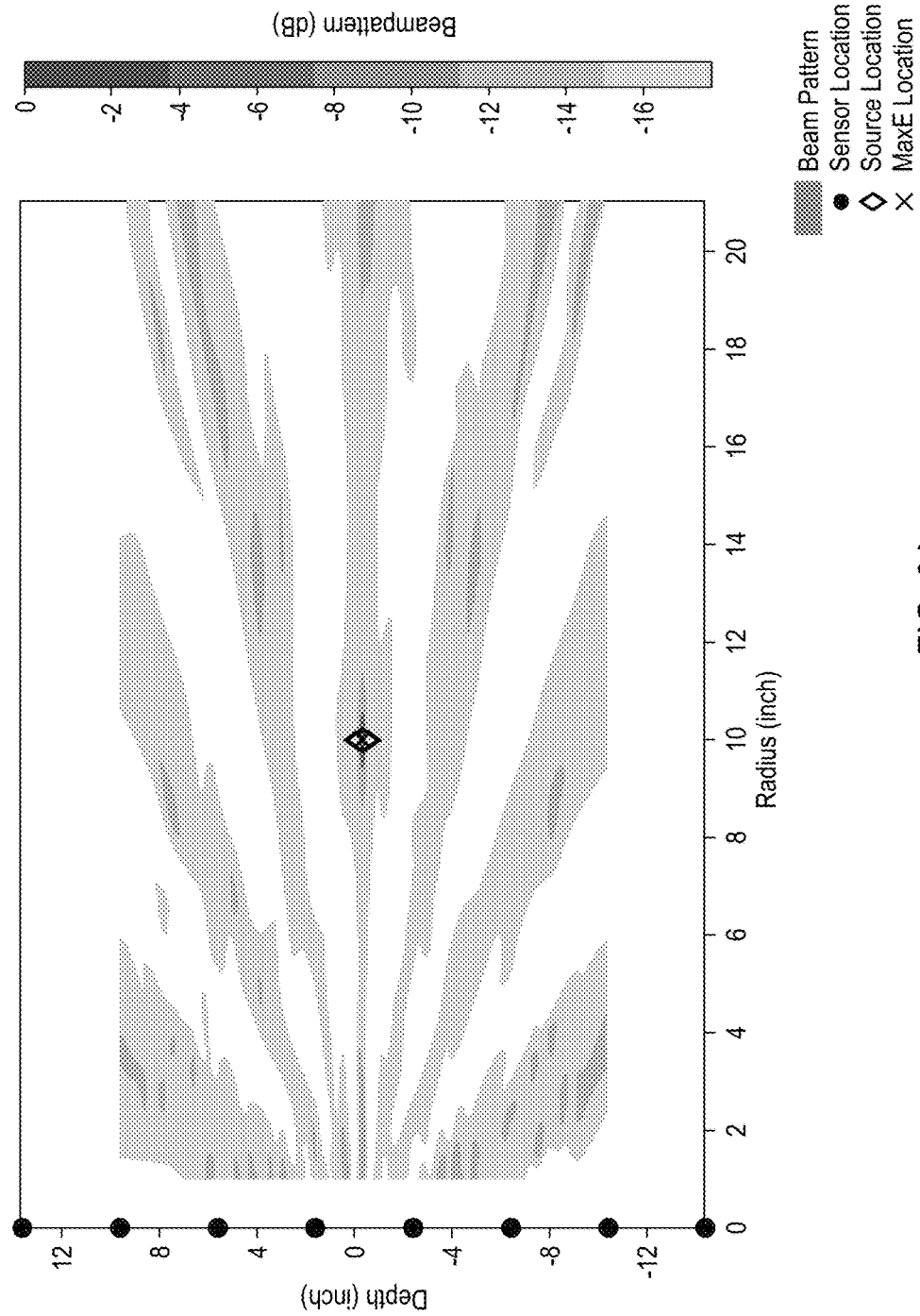
Figure 9B:
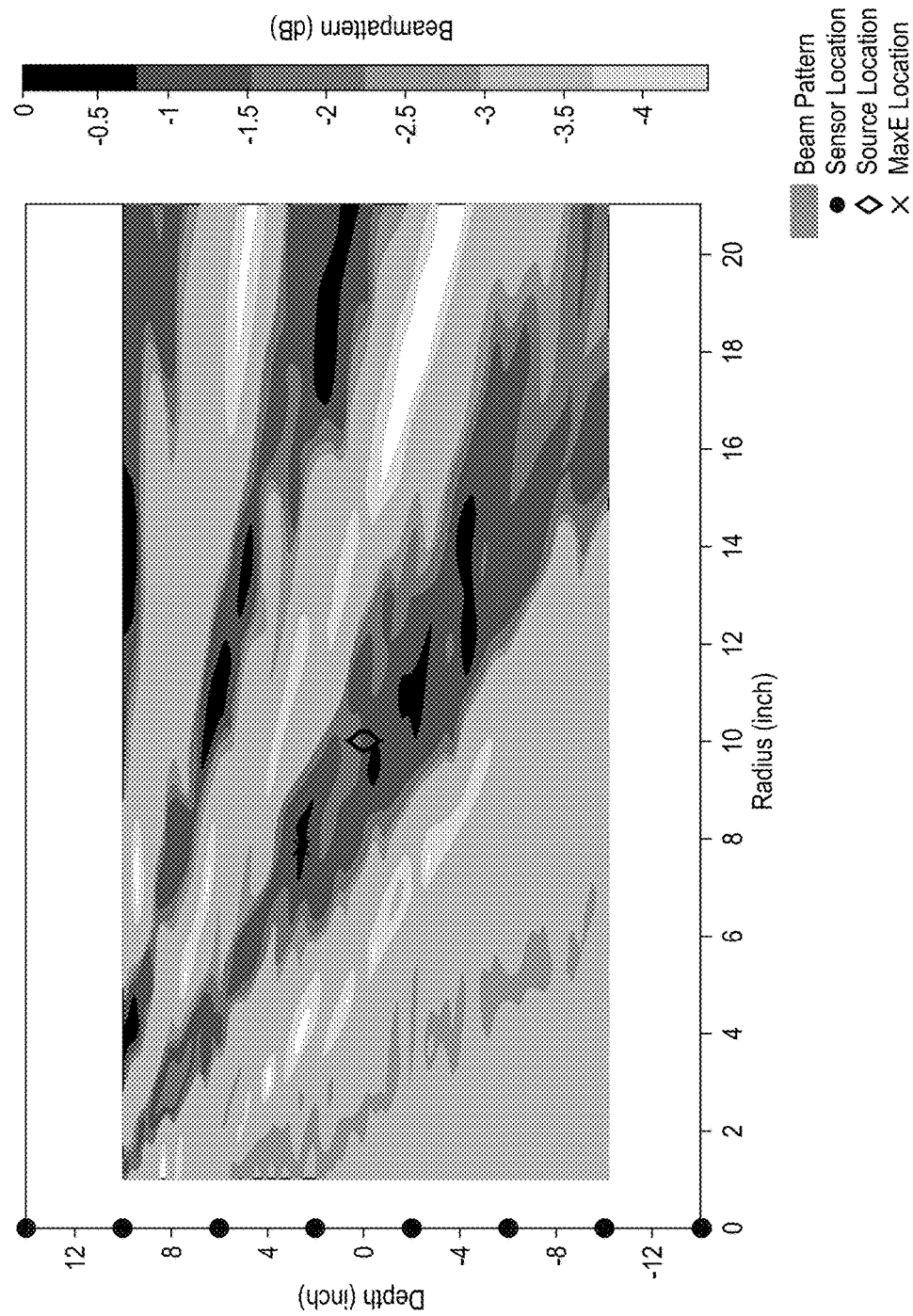

FIGS. 9A-9C compare the accuracy of (A) a stationary sensor array with fixed time independent modelled steering vector weights, (B) a moving sensor array with fixed time independent modelled steering vector weights, and (C) a moving sensor array with adaptive time dependent modelled steering vector weights where the source frequency (47 kHz) is significantly greater than the spatial aliasing frequency.

In FIG. 9A, the resultant beamformer output contains much more ambiguity due to much more aliasing as compared to FIG. 8A, which is also seen in a comparison of FIGS. 8B and 9B. However, under the conditions of FIG.

9C, the illustrated beamformer output shows that the spatial aliasing effect is reduced and the acoustic signal can be readily localized.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising: moving a sensor array comprising at least three sensors with each sensor a distance from each other along a wellbore; substantially simultaneously measuring acoustic signals from an acoustic source with each of the at least three sensors; and processing the acoustic signals in combination using an array-signal-processing technique that uses adaptive time-dependent modelled steering vector weights to identify a location of the acoustic source by a depth and a radial distance from the wellbore.

2. The method of claim 1, wherein the acoustic sensors form a linear array along a longitudinal axis of the wellbore.

3. The method of claim 1, wherein the array-signal-processing technique comprises at least one selected from a group consisting of spatial filtering, time delay estimation, and a sound-energy method.

4. The method of claim 1, wherein the acoustic sensors comprise one selected from the group consisting of: an omnidirectional hydrophone, a Fiber Bragg Grating sensor, fiber-optic cable, and any combination thereof.

5. The method of claim 1, further comprising calculating an azimuthal position of the acoustic source.

6. The method of claim 1, wherein the acoustic signals have a higher frequency than a spatial aliasing frequency used in the array-signal-processing technique.

7. The method of claim 1, wherein the acoustic signals have a lower frequency than a spatial aliasing frequency used in the array-signal-processing technique.

8. The method of claim 1, wherein a stationary condition of the sensor array is preserved by satisfying $$\Delta T_n \leq \frac{0.01|r_j|}{v_z},$$

where $\Delta T_n$ is a duration of the acoustic signal, $r_j$ is a location of a first sensor of the only three sensors, and $v_z$ is a velocity the first sensor is moving along the wellbore.

9. The method of claim 8, wherein the array-signal-processing technique comprises: applying data truncation operation to the acoustic signals to produce frames; applying a sample covariance matrix estimator to the frames to produce a sample covariance matrix; applying the Capon spatial spectrum construction operation using the fixed weight time-independent modelled steering vector weights to the sample covariance matrix to produce a Capon spatial spectrum response; and identifying the location of the acoustic source based on the Capon spatial spectrum response.

10. The method of claim 1, wherein the array-signal-processing technique comprises:
applying a frame decomposition operation to the acoustic signals to produce decomposed frames;
applying a sample covariance matrix estimator to the decomposed frames to produce a sample covariance matrix;
applying a Capon spatial spectrum construction operation using the adaptive time-dependent modelled steering vector weights to the sample covariance matrix to produce a Capon spatial spectrum response;
applying a summation and normalization operation to the Capon spatial spectrum response to produce a weighted average Capon spatial spectrum response; and
identifying the location of the acoustic signal based on the weighted average Capon spatial spectrum response.

11. A system comprising:
a sensor array movable along a wellbore and comprising at least three acoustic sensors with each sensor a distance away from each other for substantially simultaneously measuring acoustic signals from an acoustic source and received thereat; and
non-transitory computer-readable medium encoded with instructions that, when executed, perform operations:
the substantially simultaneously measuring acoustic signals from the acoustic source with each of the at least three sensors in the sensor array moving along the wellbore; and
processing the acoustic signals in combination using an array-signal-processing technique that includes an adaptive time-dependent modelled steering vector to determine a depth and a radial distance from the wellbore of the acoustic source.

12. The system of claim 11, wherein the acoustic sensors form a linear array along a longitudinal axis of the wellbore.

13. The system of claim 11, wherein the array-signal-processing technique comprises at least one selected from a group consisting of spatial filtering, time delay estimation, and a sound-energy method.

14. The system of claim 11, wherein the acoustic sensors comprise one selected from the group consisting of: an omnidirectional hydrophone, a Fiber Bragg Grating sensor, fiber-optic cable, and any combination thereof.

15. A non-transitory computer-readable medium encoded with instructions that, when executed, perform operations comprising:
substantially simultaneously measuring acoustic signals from an acoustic source with each of at least three sensors with each sensor a distance away from each other in a sensor array moving along a wellbore; and processing the acoustic signals in combination using an array-signal-processing technique that includes an adaptive time-dependent modelled steering vector to determine a depth and a radial distance from the wellbore of the acoustic source.

16. The non-transitory computer-readable medium of claim 15, wherein the acoustic sensors form a linear array along a longitudinal axis of the wellbore.

17. The non-transitory computer-readable medium of claim 15, wherein the instructions that, when executed, perform operations that further comprise: calculating an azimuthal position of the acoustic source.

18. The non-transitory computer-readable medium of claim 15, wherein a stationary condition of the sensor array is preserved by satisfying $$\Delta T_n \leq \frac{0.01|r_j|}{v_z},$$

where $\Delta T_n$ is a duration of the acoustic signal, $r_j$ is a location of a first sensor of the at least three sensors, and $v_z$ is a velocity the first sensor is moving along the wellbore.

19. The non-transitory computer-readable medium of claim 15, wherein the array-signal-processing technique comprises: applying data truncation operation to the acoustic signals to produce frames; applying a sample covariance matrix estimator to the frames to produce a sample covariance matrix; applying the Capon spatial spectrum construction operation using the fixed weight time-independent modelled steering vector weights to the sample covariance matrix to produce a Capon spatial spectrum response; and identifying the location of the acoustic source based on the Capon spatial spectrum response.

20. The non-transitory computer-readable medium of claim 15, wherein the array-signal-processing technique comprises: applying a frame decomposition operation to the acoustic signals to produce decomposed frames; applying a sample covariance matrix estimator to the decomposed frames to produce a sample covariance matrix; applying a Capon spatial spectrum construction operation using the adaptive time-dependent modelled steering vector weights to the sample covariance matrix to produce a Capon spatial spectrum response; applying a summation and normalization operation to the Capon spatial spectrum response to produce a weighted average Capon spatial spectrum response; and identifying the location of the acoustic source based on the weighted average Capon spatial spectrum response.

* * * * *